Figure 1:
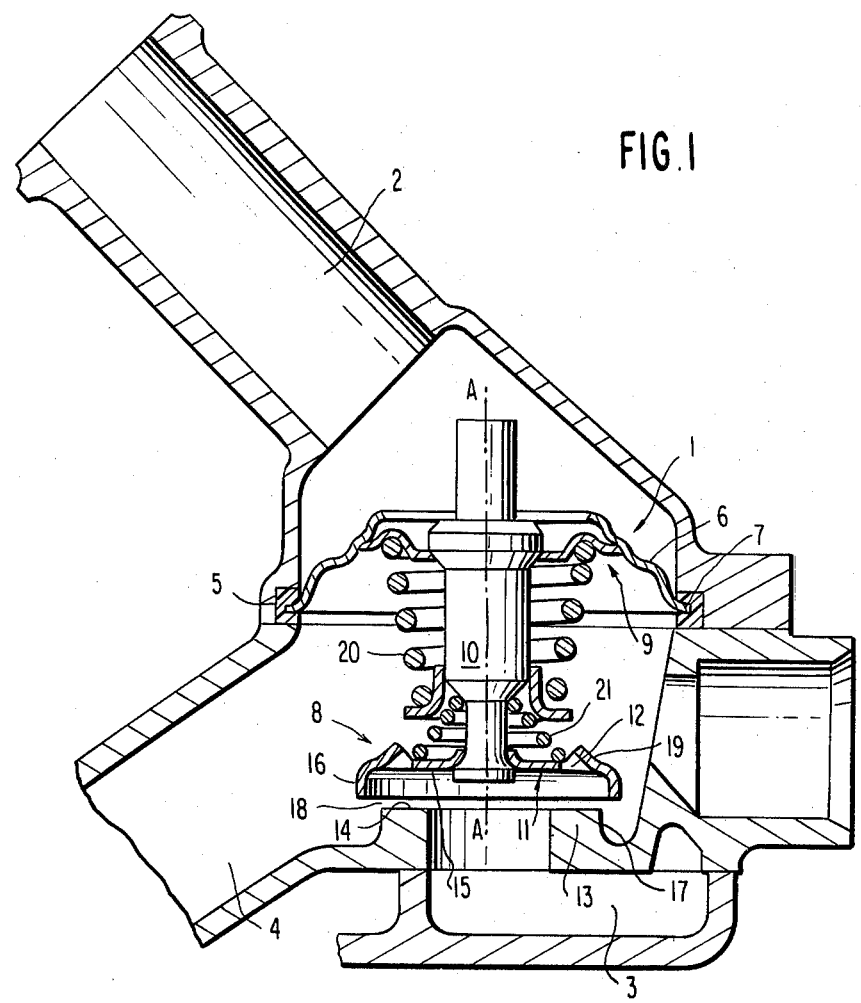

United States Patent [19]

Büter

[11] 4,456,167
[45] Jun. 26, 1984

[54] THERMOSTATICALLY CONTROLLED VALVE IN THE CIRCULATION OF LIQUID COOLED INTERNAL COMBUSTION ENGINES

[75] Inventor: Herman Büeter, Stuttgart, Fed. Rep. of Germany

[73] Assignee: Daimler-Benz Aktiengesellschaft, Stuttgart, Fed. Rep. of Germany

[21] Appl. No.: 422,490

[22] Filed: Sep. 23, 1982

[30] Foreign Application Priority Data

Sep. 26, 1981 [DE] Fed. Rep. of Germany ....... 3138368

[51] Int. Cl.³ ............................................. G05D 23/12
[52] U.S. Cl. .................................. 236/345; 236/93 A; 236/100
[58] Field of Search ....................... 236/34, 34.5, 93 A, 236/99 J, 100, 93 R; 251/120

[56] References Cited

U.S. PATENT DOCUMENTS

| | | | |
|---|---|---|---|
| 1,806,530 | 5/1931 | Giesler | 236/93 R |
| 2,177,937 | 10/1939 | Goldschmidt | 236/34.5 |
| 2,575,100 | 11/1951 | Duey | 236/93 A |
| 3,146,948 | 9/1964 | Payne | 236/93 A |
| 4,288,031 | 9/1981 | Hass | 236/34.5 |

Primary Examiner—William E. Tapolcai
Attorney, Agent, or Firm—Craig & Burns

[57] ABSTRACT

A thermostatically controlled valve in the cooling medium circulation of liquid-cooled internal combustion engines with two coaxially arranged interconnected valves which are actuatable by a temperature-dependent working element disposed therebetween and which control a radiator return line and a bypass line; the valve controlling the bypass line includes a valve disk arranged at the temperature-dependent working element and is provided with through-flow openings controlled as a function of temperature so that a partial quantity of the cooling medium can circumcirculate the temperature-dependent working element; the through-flow openings are thereby arranged in the valve disk of the valve and abut sealingly on the valve seat of this valve when the bypass line is closed.

5 Claims, 2 Drawing Figures

U.S. Patent  Jun. 26, 1984  4,456,167

THERMOSTATICALLY CONTROLLED VALVE IN THE CIRCULATION OF LIQUID COOLED INTERNAL COMBUSTION ENGINES

The present invention relates to a thermostatically controlled valve in the circulation of liquid-cooled internal combustion engines.

A thermostatically controlled valve with two interconnected valves arranged coaxially in a housing is disclosed already in the German Pat. No. 1,905,039, which are actuatable by a temperature-sensitive working element disposed between the valves, whereby the housing includes two essentially mutually oppositely disposed connections for the radiator return and the bypass line and a discharge connection around approximately perpendicularly to the displacement direction of the disk valves which leads to the engine. The valve controlling the bypass line carries a valve disk displaceably supported at an extended stem of the temperature-sensitive working element. The stem thereby includes in the longitudinal direction a through-flow channel, whose outlet in the direction toward the temperature-sensitive working element is controlled by the displacement or shifting of the valve disk. The through-flow channel consists of a bore, into which lead radial or inclined radial bores. However, it has proved disadvantageous with this prior art thermostatically controlled valve that after the abutment of the valve disk at the connection of the bypass line, an additional control travel of the working element is necessary in order to close off also the through-flow channel. Therebeyond, only a small partial quantity of the entire cooling medium circumcirculates the working element by reason of the constructive design of this valve so that the valve exhibits a considerable control inertia.

It is the principal object of the present invention to provide a thermostatically controlled valve for the circulation of a liquid-cooled internal combustion engine in which the circumcirculation of the working element is improved by the cooling medium flowing back by way of the bypass line and in which the structural expenditure is reduced.

The underlying problems are solved according to the present invention is that the through-flow openings are arranged in the valve disk of the valve and abut sealingly on the valve seat of the valve when the bypass line is closed.

It is possible by the arrangement of the through-flow openings in the valve disk itself to utilize nearly exclusively the entire cooling medium quantity for the circumcirculation of the working element, whence the control inertia becomes very small. By reason of the complete closing of the bypass line already upon abutment of the valve disk against the connection of the bypass line, the structural length of the working element can also be reduced.

Figure 2:
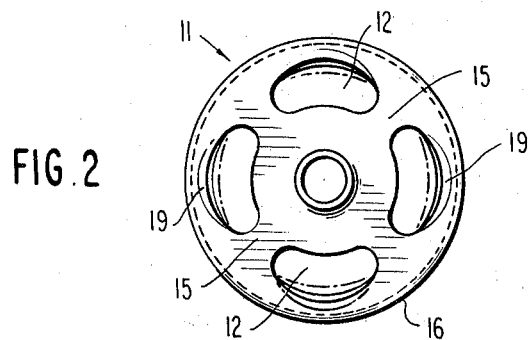

These and further objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through a cooling circulation of an internal combustion engine within the area of a thermostatically controlled valve in accordance with the present invention; and FIG. 2 is a plan view on the valve disk in accordance with the present invention.

Referring now to the drawing wherein like reference numerals are used throughout the two views to designate like parts, the thermostatically controlled valve generally designated by reference numeral 1 which is illustrated in the drawing, regulates a radiator return line 2 and a bypass line 3, from which the cooling medium is conducted back to a cooling medium pump, respectively to an inlet connection of the cooling jacket of an internal combustion engine by way of a return line 4. The radiator return line 2 has a ring-shaped aperture 5 which serves for the accommodation and fixing of the valve 1. The valve 1 includes a housing 6 with a securing flange 7, by means of which the housing 6 is clamped fast in the ring-shaped recess 5 during the assembly of the radiator return line 2, as well as two coaxially arranged interconnected valves generally designated by reference numerals 8 and 9 which are influenced by a temperature-dependent working element 10 (expansion element) disposed between the valves 8 and 9. The valve 8 controls the bypass line 3 and the valve 9 controls the radiator return line 2. A valve disk generally designated by reference numeral 11 essentially forming the valve 8 is arranged at the working element 10; the valve disk 11 is provided with the through-flow openings 12 which cooperate with the valve seat 14 formed by the end face of the connection 13 of the bypass line 3. The valve disk 11 includes a plane base portion 15 provided with the through-flow openings 12, which is provided with an at least approximately cylindrical collar 16 that overlaps in a temperature-dependent manner the circumferential surface 17 of the connection 13 while maintaining an annular gap 18 for the cooling medium. The through-flow openings 12 are preferably several elongated apertures arranged concentrically to the axis A—A of the valve 1 and symmetrically in the base portion 15. The through-flow openings 12 and the cooling-medium annular gap 18 can be designed and/or matched to one another corresponding to the operating requirements. For purposes of achieving a directed cooling medium flow, the through-flow openings 12 include guide surfaces 19 extending from the collar 16 of the valve disk 11 obliquely to the axis A—A of the valve 1. A compression spring 20 is arranged coaxially to the axis A—A of the valve 1 effectively between the valve 9 and the housing 6 while a compression spring 21 is arranged coaxially to the axis A—A of the valve 1 effectively between the valve 8 and the housing 6.

If the inflowing cooling medium which flows in through the bypass line 3 has a temperature below the opening temperature of the temperature-dependent working element 10, then the valve 1 is in the position illustrated in FIG. 1, in which the radiator return line 2 is closed off with respect to the return line 4 and the bypass line 3 is opened with respect to the return line 4. A partial quantity of the cooling medium flows from the bypass line 3 through the cooling-medium annular gap 18 to the return line 4, and the remaining partial quantity of the cooling medium flows from the bypass line 3 through the through-flow openings 12 to the return line 4, whereby this remaining partial quantity circumcirculates the working element 10 directed by the guide surfaces 19. For purposes of achieving an optimum function of the valve 1, one aims at an arrangement pursuant to which the partial quantity flowing through the through-flow openings 12 constitutes a substantial part of the entire cooling medium flow.

With an increased warm-up of the cooling medium, the valve 1 is displaced or shifted by the working element 10, passing through intermediate positions in which the bypass line 3 and the return line 2 are partially opened, into a position in which the entire cooling medium flows from the radiator return line 2 to the return line 4 through the fully opened valve 9 while the bypass line 3 is closed. In this position the valve disk 11 has come into abutment with its base portion 15 on the valve seat 14 formed by the end face of the connection 13 upon reaching the maximum opening position of the valve 9 so that the through-flow openings 12 are closed off.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A thermostatically controlled valve in the cooling circulation of liquid-cooled internal combustion engines, comprising two substantially coaxially arranged interconnected valve means actuatable by a temperature-dependent working element disposed between the valve means and controlling a radiator return line means and a bypass line means, the valve means controlling the bypass line means having a valve disk arranged at the temperature-dependent working element and being provided with through-flow openings controlled in dependence on temperature for a partial quantity of the cooling medium circumcirculating the working element, the through-flow openings being arranged in said valve disk, the valve disk having a substantially plane base portion provided with the through-flow openings cooperating with an end face of a connection of the bypass line means forming a valve seat, and with a closed bypass line, the through-flow openings sealingly resting on the valve seat of the valve means by controlling the bypass line means.

2. The valve with a connection for the bypass line means according to claim 1, wherein the base portion of the valve disk has an at least approximately cylindrical collar cooperating as a function of temperature with a circumferential surface of said connection while maintaining an annular gap for the cooling medium.

3. The valve according to claim 2, wherein the through-flow openings are elongated apertures arranged in the base portion of the valve disk.

4. The valve according to claim 3, wherein the through-flow openings are several elongated apertures arranged in the base portion of the valve disk concentrically to the axis of the valve means for the bypass line means and substantially symmetrically in the base portion of the valve disk.

5. The valve according to claim 2, wherein the through-flow openings include guide surfaces extending from the collar of the valve disk obliquely to the axis of the valve means for purposes of achieving a directed cooling medium flow.

* * * * *